US012420845B2

(12) United States Patent
Kim et al.

(10) Patent No.: US 12,420,845 B2
(45) Date of Patent: Sep. 23, 2025

(54) METHOD OF DETERMINING DRIVING PLAN FOR AUTONOMOUS VEHICLE BASED ON ROAD USER PREDICTION, COMPUTING DEVICE FOR PERFORMING THE SAME, AND RECORDING MEDIUM ON WHICH PROGRAM FOR PERFORMING THE SAME IS RECORDED

(71) Applicant: RideFlux Inc., Jeju-si (KR)

(72) Inventors: Sohyun Kim, Seoul (KR); Hawook Jeong, Seoul (KR)

(73) Assignee: RideFlux Inc., Jeju-si (KR)

( * ) Notice: Subject to any disclaimer, the term of this patent is extended or adjusted under 35 U.S.C. 154(b) by 214 days.

(21) Appl. No.: 18/348,958

(22) Filed: Jul. 7, 2023

(65) Prior Publication Data
US 2024/0025455 A1 Jan. 25, 2024

(30) Foreign Application Priority Data
Jul. 19, 2022 (KR) .................. 10-2022-0089038

(51) Int. Cl.
*B60W 60/00* (2020.01)
*G06N 3/04* (2023.01)
(52) U.S. Cl.
CPC .......... *B60W 60/0027* (2020.02); *G06N 3/04* (2013.01); *B60W 2556/45* (2020.02)
(58) Field of Classification Search
CPC ..... B60W 60/0027; B60W 2050/0028; B60W 50/0098; B60W 2554/4042;
(Continued)

(56) References Cited

U.S. PATENT DOCUMENTS 11,126,186 B2 * 9/2021 McGill, Jr. .......... G05D 1/0255
12,112,279 B2 * 10/2024 Hayashi ............... B60W 30/08
(Continued)

FOREIGN PATENT DOCUMENTS

CN 110789528 B * 3/2022 ........... B60W 40/10
CN 114291116 B * 5/2023
(Continued)

OTHER PUBLICATIONS

"Kim, J; Kum, D; Collision Risk Assessment Algorithm via Lane-Based Probabilistic Motion Prediction of Surrounding Vehicles; Sep. 2018; IEEE Transactions on Intelligent Transportation Systems, vol. 19, No. 9" (Year: 2018).*

*Primary Examiner* — Ramya P Burgess
*Assistant Examiner* — Christopher R Cardimino
(74) *Attorney, Agent, or Firm* — Studebaker Brackett PLLC

(57) ABSTRACT

Provided are a method determining a driving plan for an autonomous vehicle on the basis of road user prediction, a computing device for performing the same, and a recording medium on which a program for performing the same is recorded. The method performed by a computing device includes generating first prediction data including prediction results about a plurality of road users near an autonomous vehicle, generating second prediction data including only a prediction result about at least one of the plurality of road users, and determining a driving plan for the autonomous vehicle using the generated first prediction data and the generated second prediction data.

11 Claims, 8 Drawing Sheets

(58) Field of Classification Search
CPC ..... B60W 2554/4045; B60W 2555/60; B60W 2556/50; B60W 60/00276; G06N 3/0464; G06N 3/0455
See application file for complete search history.

(56) References Cited

U.S. PATENT DOCUMENTS

| | | | |
|---|---|---|---|
| 12,128,887 B1* | 10/2024 | Kiiski | G06V 20/58 |
| 2019/0064815 A1* | 2/2019 | Haynes | B60W 30/095 |
| 2019/0213406 A1* | 7/2019 | Porikli | G06V 20/597 |
| 2020/0156632 A1* | 5/2020 | Ding | B60W 30/0956 |
| 2024/0004961 A1* | 1/2024 | Tairbekov | G06F 18/214 |
| 2024/0202393 A1* | 6/2024 | Dobre | B60W 60/0011 |

FOREIGN PATENT DOCUMENTS

| | | |
|---|---|---|
| JP | 2008-123217 A | 5/2008 |
| JP | 2010-044443 A | 2/2010 |
| JP | 2019-109691 A | 7/2019 |
| JP | 2019-153277 A | 9/2019 |
| KR | 10-2020-0085142 A | 7/2020 |
| KR | 10-2274806 B1 | 7/2021 |

\* cited by examiner

METHOD OF DETERMINING DRIVING PLAN FOR AUTONOMOUS VEHICLE BASED ON ROAD USER PREDICTION, COMPUTING DEVICE FOR PERFORMING THE SAME, AND RECORDING MEDIUM ON WHICH PROGRAM FOR PERFORMING THE SAME IS RECORDED

CROSS-REFERENCE TO RELATED APPLICATION

This application claims priority to and the benefit of Korean Patent Application No. 2022-0089038, filed on Jul. 19, 2022, the disclosure of which is incorporated herein by reference in its entirety.

BACKGROUND

1. Field of the Invention

The present invention relates to a device and method for determining a driving plan for an autonomous vehicle on the basis of road user prediction and a recording medium on which a program for the method is recorded.

2. Discussion of Related Art

For the convenience of users who drive vehicles, various sensors and electronic devices (e.g., an advanced driver assistance system (ADAS)) are being provided. In particular, technological development for an autonomous driving system for a vehicle that recognizes surroundings without the driver's intervention and automatically drives the vehicle to a given destination according to the recognized surroundings is actively being pursued.

Here, an autonomous vehicle is a vehicle with an autonomous driving system function of recognizing surroundings without a driver's intervention and automatically traveling to a given destination according to the recognized surroundings.

The autonomous driving system performs localization, perception, prediction, planning, and control for autonomous driving.

Localization is an operation of estimating a location, an attitude, a velocity, and the like of the autonomous vehicle, and perception is an operation of recognizing whether there is a vehicle, a pedestrian, an obstacle, or the like near the autonomous vehicle, a distance from the nearby vehicle, pedestrian, obstacle, or the like, a velocity of the nearby vehicle, pedestrian, obstacle, etc., the shape of the road, and traffic signals. Also, prediction is an operation of predicting a future state (e.g., a future position, velocity, route, etc.) of a nearby vehicle, pedestrian, or the like and a possible dangerous situation (e.g., collision). Planning is an operation of determining the most desirable action (e.g., a route, a velocity, an acceleration, etc.) of the autonomous vehicle, and finally, control is an operation of controlling movement (braking, acceleration, steering, etc.) of the autonomous vehicle so that the autonomous vehicle travels as planned.

In other words, in determining a driving plan for an autonomous vehicle, accurately predicting a future action of a road user near the autonomous vehicle (e.g., a vehicle, a motorcycle, a bicycle, a pedestrian, or the like near the autonomous vehicle) may not only improve safety of the autonomous vehicle but also contribute to an increase in the convenience and satisfaction of passengers in the autonomous vehicle. Accordingly, this is a very important element of the autonomous driving system.

Meanwhile, to make autonomous vehicles travel more safely while the road user prediction technology is not fully developed, there is no choice but to conservatively predict future states of road users. Accordingly, there may be a problem of excessively controlling operations of an autonomous vehicle to avoid potential danger. For example, the velocity of an autonomous vehicle may be drastically reduced, an autonomous vehicle may be driven at an excessively low velocity, or an autonomous vehicle may be controlled to constantly stop even though it is possible to keep traveling.

SUMMARY OF THE INVENTION

The present invention is directed to providing a device and method for determining a driving plan for an autonomous vehicle on the basis of road user prediction which produce an accurate prediction result about a road user by making a prediction about the road user through two different prediction models and improve the safety of an autonomous vehicle and the convenience and satisfaction of a passenger by determining a driving plan for the autonomous vehicle on the basis of the prediction result, and a recording medium on which a program for the method is recorded.

The present invention is also directed to providing a device and method for determining a driving plan for an autonomous vehicle on the basis of road user prediction which make a prediction about a road user through an algorithm-based first prediction model and a data learning-based second prediction model and have improved prediction performance while minimizing an increase in the amount of computation by making predictions about all road users through the first prediction model and making predictions about significant road users through the second prediction model, and a recording medium on which a program for the method is recorded.

Objects to be achieved by the present invention are not limited to those described above, and other objects which have not been described will be clearly understood by those of ordinary skill in the art from the following description.

According to an aspect of the present invention, there is provided a method of determining a driving plan for an autonomous vehicle on the basis of road user prediction which is performed by a computing device, the method including generating first prediction data including prediction results about a plurality of road users near an autonomous vehicle, generating second prediction data including only a prediction result about at least one of the plurality of road users, and determining a driving plan for the autonomous vehicle using the generated first prediction data and the generated second prediction data.

The method may further include collecting data on the autonomous vehicle and surroundings of the autonomous vehicle and generating input data for road user prediction using the collected data. The generated input data may include at least one of perception data including data on the plurality of road users, localization data including the data on the autonomous vehicle, map data of an area in which the autonomous vehicle is present, and plan data of a driving plan determined in advance for the autonomous vehicle.

The generating of the first prediction data may include predicting an expected driving plan, which includes an expected driving path and an expected velocity profile, for each of the plurality of road users by analyzing the generated input data using an algorithm-based first prediction model and generating the first prediction data including the predicted expected driving plan.

The predicting of the expected driving plan may include, when a plurality of expected driving plans are predicted for any one of the plurality of road users, calculating a probability value corresponding to a possibility of each of the plurality of predicted expected driving plans.

The predicting of the expected driving plan may include, when a plurality of expected driving plans are predicted for any one of the plurality of road users, calculating an importance level of each of the plurality of predicted expected driving plans on the basis of a driving plan determined in advance for the autonomous vehicle.

The predicting of the expected driving plan may include, when a plurality of expected driving plans are predicted for any one of the plurality of road users, excluding an expected driving plan in which an acceleration in a perpendicular direction to a travel direction is a specific value or more from among the plurality of predicted expected driving plans, and when all the plurality of predicted expected driving plans are excluded, selecting only an expected driving plan having a lowest acceleration in a perpendicular direction to the travel direction from among the plurality of predicted expected driving plans.

The generating of the first prediction data may include outputting first prediction data for a first time point using first input data generated from data collected at the first time point, outputting first prediction data for a second time point using second input data generated from data collected at the second time point after the first time point, and outputting the first prediction data for the first time point as the first prediction data for the second time point when a similarity between the first input data and the second input data is a reference value or more.

The generating of the second prediction data may include predicting an expected driving plan which includes an expected driving path and an expected velocity profile, for the at least one road user by analyzing the generated input data using a data learning-based second prediction model which includes a spatial series-based artificial neural network and a time series-based artificial neural network, and generating the second prediction data including the predicted expected driving plan.

The generating of the second prediction data may include setting an object of interest using the generated first prediction data and generating the second prediction data only including a prediction result about the object of interest by analyzing only data on the set object of interest in the generated input data.

The setting of the object of interest may include setting at least one road user who influences the determination of the driving plan for the autonomous vehicle among the plurality of road users as the object of interest on the basis of the generated first prediction data.

The generating of the second prediction data may include generating the second prediction data only including a prediction result about a specific road user by analyzing only data on the specific road user in first data collected at a first time point. The specific road user may be an object of interest set on the basis of second data collected at a second time point before the first time point.

According to another aspect of the present invention, there is provided a computing device for performing a method of determining a driving plan for an autonomous vehicle on the basis of road user prediction, the computing device including a processor, a network interface, a memory, and a computer program which is loaded into the memory and executed by the processor. The computer program includes an instruction for generating first prediction data including prediction results about a plurality of road users near an autonomous vehicle, an instruction for generating second prediction data including only a prediction result about at least one of the plurality of road users, and an instruction for determining a driving plan for the autonomous vehicle using the generated first prediction data and the generated second prediction data.

According to another aspect of the present invention, there is provided a computer program stored in a recording medium readable by a computing device to perform a method of determining a driving plan for an autonomous vehicle on the basis of road user prediction, the method including generating first prediction data including prediction results about a plurality of road users near an autonomous vehicle, generating second prediction data including only a prediction result about at least one of the plurality of road users, and determining a driving plan for the autonomous vehicle using the generated first prediction data and the generated second prediction data.

Other details of the present invention are included in detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
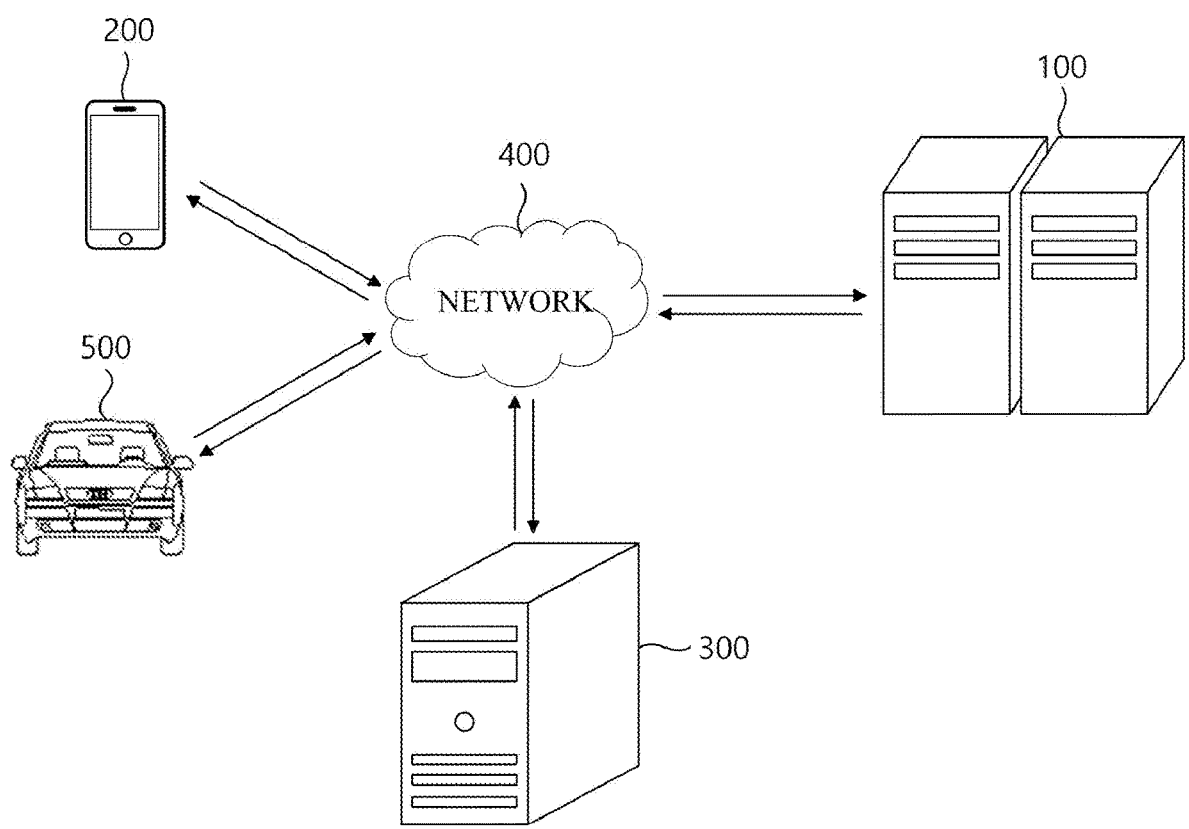
FIG. 1 is a diagram illustrating an autonomous driving system according to an exemplary embodiment of the present invention.

Advantages and features of the present invention and methods of achieving them will become apparent with reference to embodiments described in detail below with the accompanying drawings. However, the present invention is not limited to the embodiments disclosed below and can be implemented in various different forms. The embodiments are only provided to make the disclosure of the present invention complete and fully convey the scope of the present invention to those skilled in the technical field to which the present invention pertains. The present invention is only defined by the scope of the claims.

The terminology used herein is for the purpose of describing the embodiments and is not intended to limit the present invention. In this specification, a singular form also includes a plural form unless a phrase specifically states otherwise. As used in this specification, "comprises" and/or "comprising" do not exclude the presence or addition of one or more components other than stated components. Throughout the specification, the like reference numerals refer to like components, and "and/or" includes each and all combinations of one or more stated components. Although the terms "first," "second," and the like are used to describe various components, these components are not limited by these terms. These terms are only used to distinguish one component from others. Accordingly, a first component mentioned below may be a second component within the technical spirit of the present invention.

Unless otherwise defined, all terms (including technical and scientific terms) used herein may be used with the meaning commonly understood by those skilled in the technical field to which the present invention pertains. In addition, terms defined in a commonly used dictionary are not to be interpreted ideally or excessively unless specifically defined explicitly.

As used herein, the term "part" or "module" refers to a software component or a hardware component such as a field programmable gate array (FPGA) or an application-specific integrated circuit (ASIC), and the "part" or "module" performs certain roles. However, the term "part" or "module" is not limited to software or hardware. The term "part" or "module" may be configured to reside on an addressable storage medium or run on one or more processors. Accordingly, as an example, the term "part" or "module" includes components, such as software components, object-oriented software components, class components, and task components, processes, functions, attributes, procedures, subroutines, segments of program code, drivers, firmware, microcode, circuitry, data, databases, data structures, tables, arrays, and variables. Components and functions provided in "parts" or "modules" may be combined into a smaller number of components and "parts" or "modules" or may be subdivided into additional components and "parts" or "modules."

Spatially relative terms such as "below," "beneath," "lower," "above," "upper," and the like can be used to easily describe the relationship between a certain component and other components shown in the drawings. The spatially relative terms are to be understood as terms that include different directions of components during use or operation in addition to the directions illustrated in the drawings. For example, when a component illustrated in the drawings is turned over, the component described as "below" or "beneath" another component may be placed "above" the other component. Accordingly, the exemplary term "below" may include both directions, below and above. Components may also be oriented in other directions, and thus, spatially relative terms may be interpreted depending on the orientation.

In this specification, a computer denotes any type of hardware device including at least one processor and may be understood as collectively including software configurations operating in a corresponding hardware device according to embodiments. For example, a computer may be understood as, but is not limited to, a meaning including all of a smartphone, a tablet personal computer (PC), a desktop computer, a laptop computer, and a user client and an application running on each device.

Hereinafter, exemplary embodiments of the present invention will be described in detail with reference to the accompanying drawings.

Each step described in this specification is described as being performed by a computer, but the subject of each step is not limited thereto. At least a part of each step may be performed in different devices according to embodiments.

FIG. 1 is a diagram illustrating an autonomous driving system according to an exemplary embodiment of the present invention.

Referring to FIG. 1, an autonomous driving system according to the exemplary embodiment of the present invention may include a computing device 100, a user terminal 200, an external server 300, and a network 400.

The autonomous driving system shown in FIG. 1 is in accordance with the exemplary embodiment, and components thereof are not limited to the exemplary embodiment shown in FIG. 1 and may be added, changed, or removed as necessary.

In an exemplary embodiment, the computing device 100 may determine a driving plan for an autonomous vehicle 500. For example, the computing device 100 may predict an action of a road user (e.g., a user on the road such as a vehicle, a motorcycle, a bicycle, a pedestrian, etc.) using data on the autonomous vehicle 500 and data on surroundings of the autonomous vehicle 500 and determine a driving plan for the autonomous vehicle 500 on the basis of the prediction result.

Figure 6:
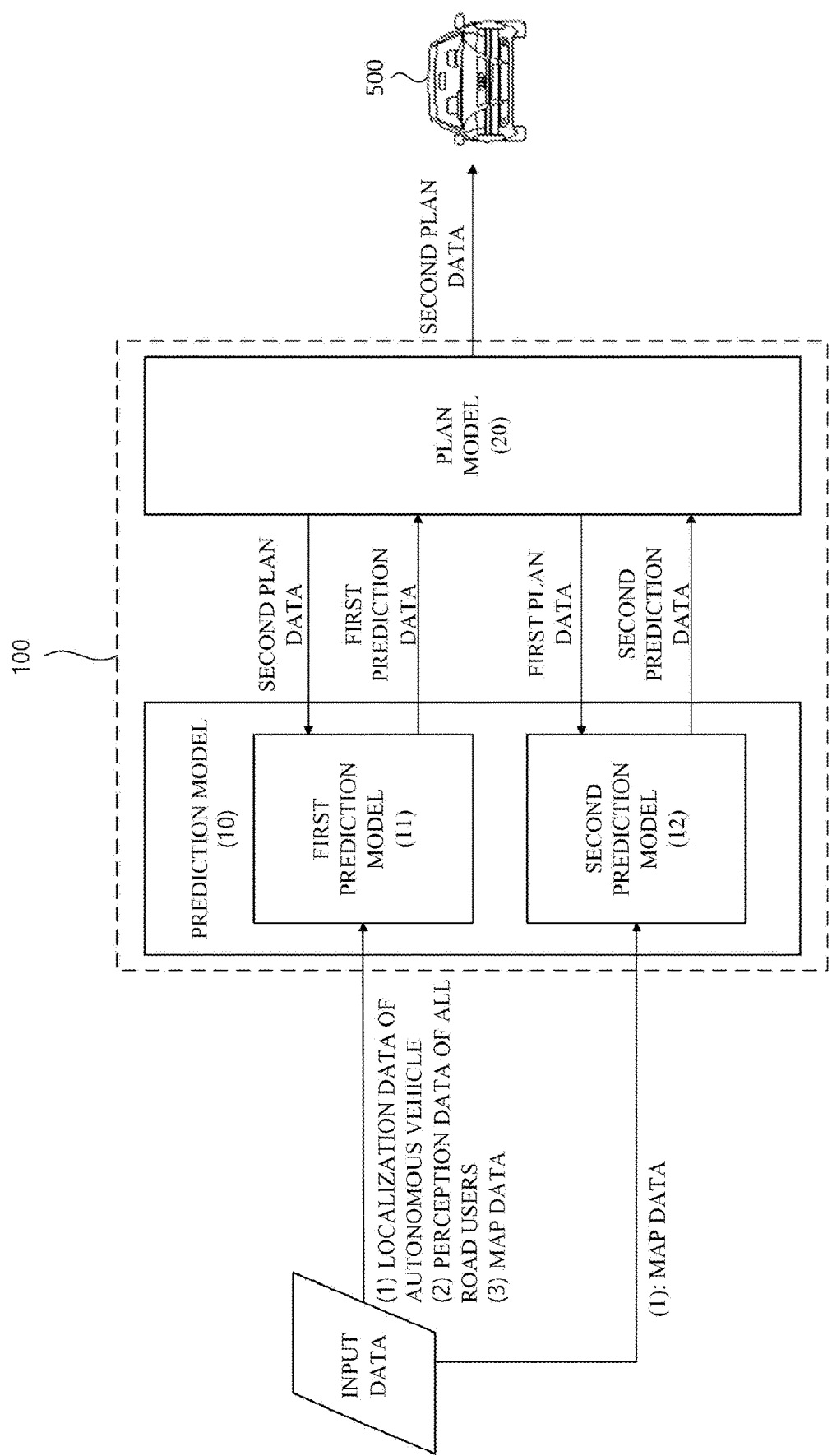
FIG. 6 is a diagram illustrating a process of determining a driving plan for an autonomous vehicle on the basis of road user prediction according to the first embodiment.
Figure 8:
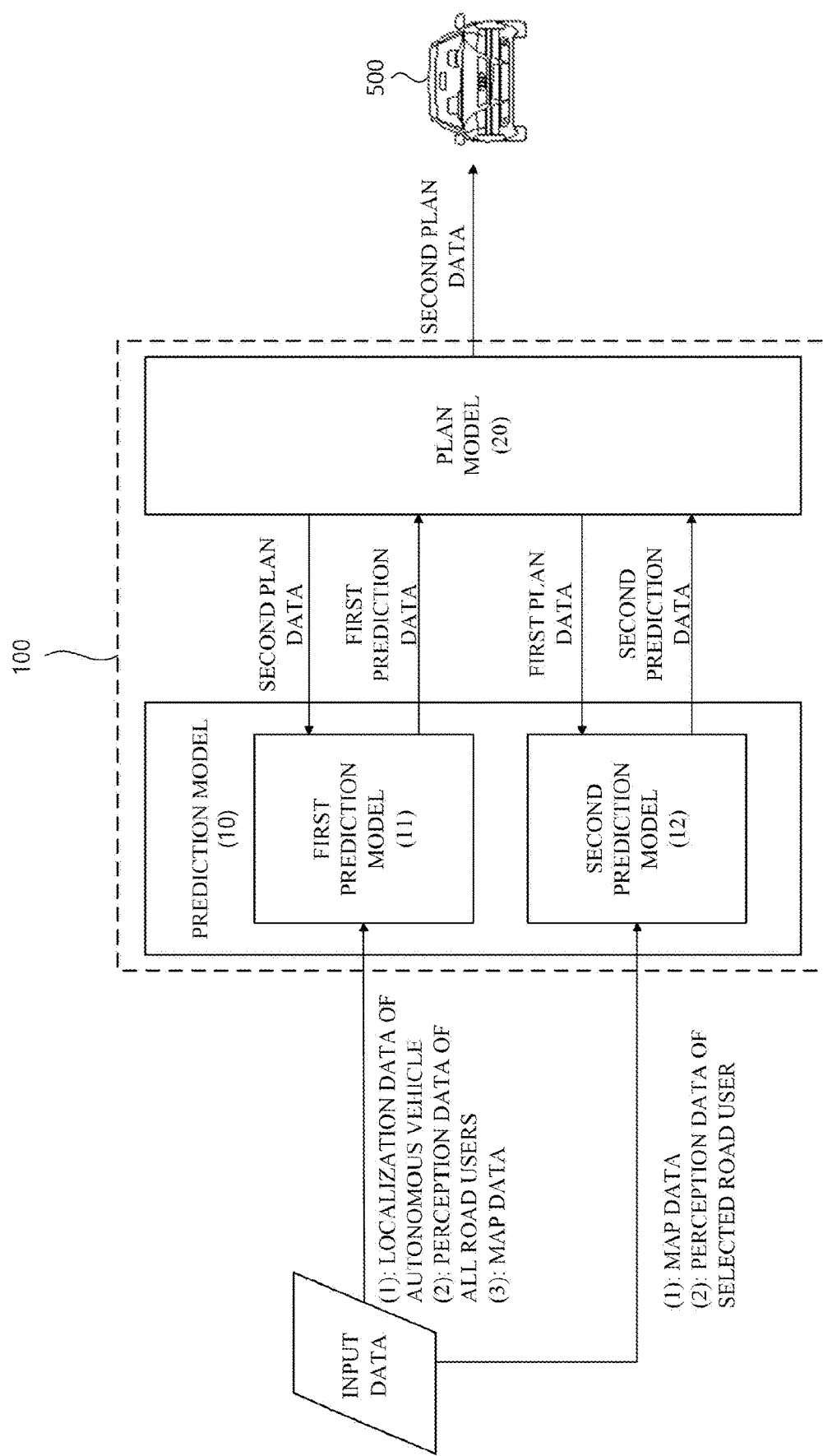
FIG. 8 is a diagram illustrating a process of determining a driving plan for an autonomous vehicle on the basis of road user prediction according to the second embodiment.

In various embodiments, the computing device 100 may predict an action of at least one road user near the autonomous vehicle 500 by analyzing data on the autonomous vehicle 500 and data on surroundings of the autonomous vehicle 500 using a pretrained prediction model (e.g., 10 of FIGS. 6 and 8).

Here, the prediction model 10 (e.g., a neural network) includes one or more network functions, each of which may be a set of interconnected calculation units generally referred to as "nodes." Such "nodes" may also be referred to as "neurons." The one or more network functions may include one or more nodes. The nodes (neurons) constituting the one or more network functions may be interconnected via one or more "links."

In the prediction model 10, the one or more nodes connected via the links may be in a relative relationship between an input node and an output node. The concepts of an input node and an output node are relative to each other. A node which is an output node for one node may be an input node for another node, and vice versa. As described above, the relationship between an input node and an output node may be established on the basis of a link. One or more output nodes may be connected to one input node, and vice versa.

In the relationship between an input node and an output node connected via one link, a value of the output node may be determined on the basis of data input to the input node. Here, a node interconnecting the input node and the output node may have a weight. The weight may be variable and may be changed by a user or an algorithm to perform a function required by the prediction model 10. For example, when one or more input nodes are connected to one output node via separate links, the output node may determine an output node value on the basis of values input to the input nodes connected to the output node and weights set for the links corresponding to the input nodes.

As described above, in the prediction model 10, one or more nodes are interconnected via one or more links and have relationships of input nodes and output nodes. Characteristics of the prediction model 10 may be determined depending on the number of nodes and links, connections between the nodes and the links, and weight values given to the links. For example, when two prediction models 10 have the same number of nodes and links and different weights for the links, the two prediction models 10 may be recognized as different from each other.

Some nodes constituting the prediction model 10 may constitute one layer on the basis of their distances from an initial input node. For example, a set of nodes having a distance of n from the initial input node may constitute a layer of n. The distance from the initial input node may be defined by the minimum number of links required to reach the corresponding node from the initial input node. However, the definition of a layer is arbitrary for description, and the order of a layer in the prediction model 10 may be defined according to a method different from that described above. For example, a layer of nodes may be defined by the distance from a final output node.

The initial input node may be one or more nodes to which data is directly input without passing through links in the relationships with other nodes among the nodes in the prediction model 10. Alternatively, in the relationship between nodes based on a link in the network of the prediction model 10, the initial input node may be a node which does not have other input nodes connected via links. Similarly, the final output node may be one or more nodes which do not have output nodes in the relationship with other nodes among the nodes in the prediction model 10. Also, a hidden node may be a node constituting the prediction model 10 other than the initial input node and the final output node. In the prediction model 10 according to an exemplary embodiment of the present invention, the number of nodes of an input layer may be larger than the number of nodes of a hidden layer close to an output layer, and the number of nodes may decrease from the input layer to the hidden layer.

The prediction model 10 may include one or more hidden layers. Hidden nodes of the hidden layers may use an output of a previous layer and outputs of nearby hidden nodes as inputs. The number of hidden nodes of each hidden layer may be uniform or variable. The number of nodes of the input layer may be determined on the basis of the number of data fields of input data and may be equal to or different from the number of hidden nodes. The input data input to the input layer may be calculated by the hidden nodes of the hidden layers and output by a fully connected layer (FCL) which is the output layer.

In various embodiments, the prediction model 10 may be a deep learning model.

The deep learning model (e.g., a deep neural network (DNN)) may be the prediction model 10 including a plurality of hidden layers in addition to the input layer and the output layer. When the DNN is used, the latent structures of data may be determined. In other words, latent structures of photos, text, video, voice, and music (e.g., what objects are in the photos, what the content and feelings of the text are, what the content and feelings of the voice are, etc.) may be determined.

The DNN may include, but is not limited to, a convolutional neural network (CNN), a recurrent neural network (RNN), an auto encoder, a generative adversarial network (GAN), a restricted Boltzmann machine (RBM), a deep belief network (DBN), a Q network, a U network, a Siamese network, etc.

In various embodiments, the network functions may include an auto encoder. Here, the auto encoder may be an artificial neural network for outputting output data similar to input data.

The auto encoder may include at least one hidden layer, and an odd number of hidden layers may be disposed between an input layer and an output layer. The number of nodes of each layer may decrease from the input layer to an intermediate layer referred to as a "bottleneck layer (encoding)" and increase symmetrically with the decrease from the bottleneck layer to the output layer (symmetrical to the input layer). Nodes of dimensional reduction layers may or may not be symmetrical to nodes of dimensional recover layers. The auto encoder may perform non-linear dimensional reduction. The number of input layers and output layers may correspond to the number of sensors remaining after preprocessing of input data. In the auto encoder structure, the number of nodes of a hidden layer included in the encoder may decrease with an increase in the distance from the input layer. When the number of nodes of the bottleneck layer (a layer with the smallest number of nodes positioned between an encoder and a decoder) is too small, a sufficient amount of data may not be transmitted. Accordingly, the number of nodes of the bottleneck layer may be maintained at a specific value or more (e.g., half the number of nodes of the input layer or more).

The neural network may be trained in at least one scheme among supervised learning, unsupervised learning, and semi-supervised learning. The training of the neural network is for the purpose of minimizing an error of an output. More specifically, the training of the neural network is a process of repeatedly inputting training data to the neural network and calculating an output of the neural network for the training data and an error of a target and backpropagating the error of the neural network from the output layer of the neural network toward the input layer in a direction for reducing the error to update the weight of each node of the neural network.

In the case of supervised learning, each piece of training data that is used is labeled with a correct answer (i.e., labeled training data), and in the case of unsupervised learning, each piece of training data may not be labeled with a correct answer. In other words, for example, training data of supervised learning related to data classification may be training data of which each piece is labeled with a category. The labeled training data is input to the neural network, and an output (a category) of the neural network is compared with the label of the training data so that an error may be calculated.

In the case of unsupervised learning related to data classification, input training data may be compared with an output of the neural network to calculate an error. The calculated error is backpropagated in a reverse direction (i.e., a direction from the output layer toward the input layer) in the neural network, and connection weights of nodes in each layer of the neural network may be updated according to the backpropagation. A variation of the updated connection weight of each node may be determined according to a learning rate. Calculation of the neural network for the input data and the backpropagation of the error may constitute a learning cycle (epoch). The learning rate may be applied differently according to the number of repetitions of the learning cycle of the neural network. For example, in an early stage of learning of the neural network, the neural network may quickly ensure a certain level of performance using a high learning rate, thereby increasing efficiency. In a latter stage of learning, a low learning rate may be used to increase accuracy.

In learning of the neural network, training data may generally be a subset of actual data (i.e., data to be processed using the trained neural network). Accordingly, there may be a learning cycle in which an error for the training data decreases but an error for actual data increases. Overfitting is a phenomenon in which an error for actual data increases due to excessive learning of training data. For example, a phenomenon may correspond to overfitting in which the neural network that has learned cats through yellow cats sees a non-yellow cat and does not recognize the non-yellow cat as a cat. Overfitting may cause an increase in errors of machine learning algorithms. To prevent overfitting, various optimization methods may be used. To prevent overfitting, a method of increasing training data, regularization, dropout of omitting some nodes of the network in the learning process, or the like may be used.

In various embodiments, the computing device 100 may control autonomous driving for the autonomous vehicle 500 according to the driving plan determined with the above method. Here, the computing device 100 may be provided in the autonomous vehicle 500 to only control autonomous driving of the autonomous vehicle 500, but is not limited thereto. In some cases, the computing device 100 may be implemented as a central server provided separately outside the autonomous vehicle 500 to control autonomous driving of all vehicles in a certain area.

In various embodiments, the computing device 100 may be connected to the user terminal 200 through the network 400 and provide driving plan data for the autonomous vehicle 500 to the user terminal 200.

Here, the user terminal 200 may be, but is not limited to, a navigation device, a personal communication system (PCS) terminal, a Global System for Mobile Communications (GSM) terminal, a personal digital cellular (PDC) terminal, a personal handyphone system (PHS) terminal, a personal digital assistant (PDA), an International Mobile Telecommunication (IMT)-2000 terminal, a code division multiple access (CDMA)-2000 terminal, a wideband CDMA (W-CDMA) terminal, a smartphone, a smartpad, a tablet PC, etc.

Also, the network 400 may be a connection structure in which a plurality of nodes, such as terminals and servers, may exchange data. For example, the network 400 may include a local area network (LAN), a wide area network (WAN), the Internet (world wide web (WWW)), a wired or wireless data communication network, a public switched telephone network (PSTN), a wired or wireless television communication network, etc.

The wireless data communication network may include, but is not limited to, a third generation (3G) network, a fourth generation (4G) network, a fifth generation (5G) network, a Third Generation Partnership Project (3GPP) network, a Fifth Generation Partnership Project (5GPP) network, a Long Term Evolution (LTE) network, a World Interoperability for Microwave Access (WiMAX) network, a Wi-Fi network, the Internet, a LAN, a wireless LAN, a WAN, a personal area network (PAN), a radio frequency (RF) network, a Bluetooth network, a near-field communication (NFC) network, a satellite broadcasting network, an analog broadcasting network, a digital multimedia broadcasting (DMB) network, etc.

In an exemplary embodiment, the external server 300 may be connected to the computing device 100 through the network 400 and store and manage various types of data and data required for the computing device 100 to perform a method of determining a driving plan for an autonomous vehicle on the basis of road user prediction or receive, store, and manage various types of data and data which are generated when the computing device performs the method of determining a driving plan for an autonomous vehicle on the basis of road user prediction. For example, the external server 300 may be a storage server separately provided outside the computing device 100 but is not limited thereto. A hardware configuration of the computing device 100 that performs the method of determining a driving plan for an autonomous vehicle on the basis of road user prediction will be described below with reference to FIG. 2.

Figure 2:
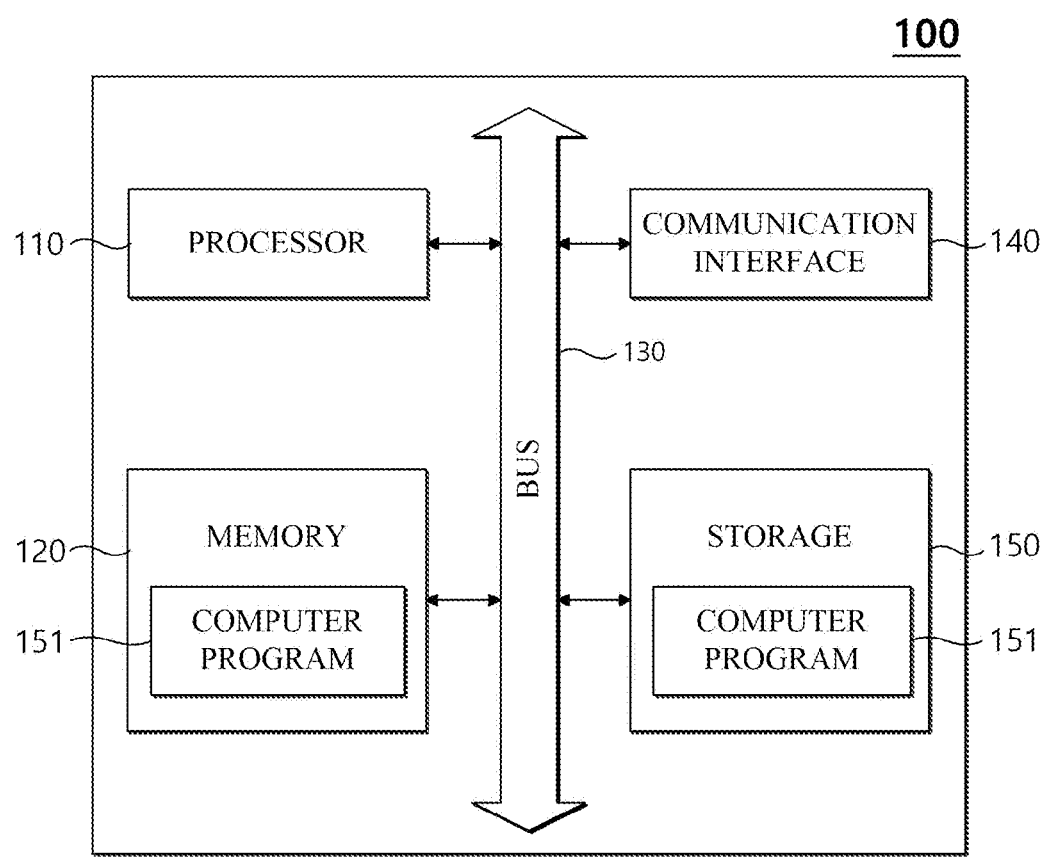
FIG. 2 is a hardware block diagram of a computing device that performs a method of determining a driving plan for an autonomous vehicle on the basis of road user prediction according to another exemplary embodiment of the present invention.

FIG. 2 is a hardware block diagram of a computing device that performs a method of determining a driving plan for an autonomous vehicle on the basis of road user prediction according to another exemplary embodiment of the present invention.

Referring to FIG. 2, in various embodiments, the computing device 100 may include at least one processor 110, a memory 120 into which a computer program 151 executed by the processor 110 is loaded, a bus 130, a communication interface 140, and a storage 150 storing the computer program 151. FIG. 2 only shows components related to embodiments of the present invention. Accordingly, those skilled in the art to which the present invention pertains will appreciate that other general-use components may be further included in addition to the components shown in FIG. 2.

The processor 110 controls overall operations of each component of the computing device 100. The processor 110 may include a central processing unit (CPU), a microprocessor unit (MPU), a microcontroller unit (MCU), a graphics processing unit (GPU), or any type of processor well known in the technical field of the present invention.

Also, the processor 110 may perform calculation of at least one application or program for performing a method according to embodiments of the present invention, and the computing device 100 may include one or more processors.

In various embodiments, the processor 110 may further include a random-access memory (RAM) (not shown) and a read-only memory (ROM) (not shown) which temporarily and/or permanently store a signal (or data) processed in the processor 110. Also, the processor 110 may be implemented in the form of a system on chip (SoC) including at least one of a GPU, a RAM, and a ROM.

The memory 120 stores various types of data, commands, and/or data. To perform a method or operation according to various embodiments of the present invention, the memory 120 may load the computer program 151 from the storage 150. When the computer program 151 is loaded into the memory 120, the processor 110 may perform the method or operation by executing one or more instructions constituting the computer program 151. The memory 120 may be implemented as a volatile memory, such as a RAM, but the technical scope of the present disclosure is not limited thereto.

The bus 130 provides a communication function between components of the computing device 100. The bus 130 may be implemented in various forms such as an address bus, a data bus, a control bus, etc.

The communication interface 140 supports wired or wireless Internet communication of the computing device 100. Also, the communication interface 140 may support various communication methods other than Internet communication. To this end, the communication interface 140 may include a communication module well known in the technical field of the present invention. In some embodiments, the communication interface 140 may be omitted.

The storage 150 may non-temporarily store the computer program 151. When a process of determining a driving plan for an autonomous vehicle on the basis of road user prediction is performed through the computing device 100, the storage 150 may store various types of data required for providing the process of determining a driving plan for an autonomous vehicle on the basis of road user prediction.

The storage 150 may include a non-volatile memory, such as a ROM, an erasable programmable ROM (EPROM), an electrically erasable programmable ROM (EEPROM), a flash memory, etc., a hard disk, a removable disk, or any form of computer-readable recording medium well known in the technical field of the present invention.

The computer program 151 may include one or more instructions causing the processor 110 to perform a method or operation according to various embodiments of the present invention when loaded into the memory 120. In other words, the processor 110 may perform the method or operation according to various embodiments of the present invention by executing the one or more instructions.

In an exemplary embodiment, the computer program 151 may include one or more instructions to perform a method of determining a driving plan for an autonomous vehicle on the basis of road user prediction, which includes an operation of generating first prediction data including prediction results about a plurality of road users near an autonomous vehicle, an operation of generating second prediction data including only a prediction result about at least one of the plurality of road users, and an operation of determining a driving plan for the autonomous vehicle using the generated first prediction data and the generated second prediction data.

Operations of a method or algorithm described in connection with exemplary embodiments of the present invention may be directly implemented by hardware, implemented by a software module executed by hardware, or implemented by a combination of hardware and a software module. The software module may reside in a RAM, a ROM, an EPROM, an EEPROM, a flash memory, a hard disk, a removable disk, a compact disc (CD)-ROM, or any form of computer-readable recording medium well known in the technical field of the present invention.

Components of the present invention may be implemented as a program (or an application) and stored in a medium to be executed in combination with a computer which is hardware. Components of the present invention may be executed by software programming or as software elements. Similarly, an exemplary embodiment may be implemented in a programming or scripting language, such as C, C++, Java, assembler, etc., including various algorithms which are implemented as any combination of data structures, processes, routines, or other programming elements. Functional aspects may be implemented as an algorithm executed by at least one processor. A method of determining a driving plan for an autonomous vehicle on the basis of road user prediction which is performed by the computing device 100 will be described below with reference to FIGS. 3 to 8.

Figure 3:
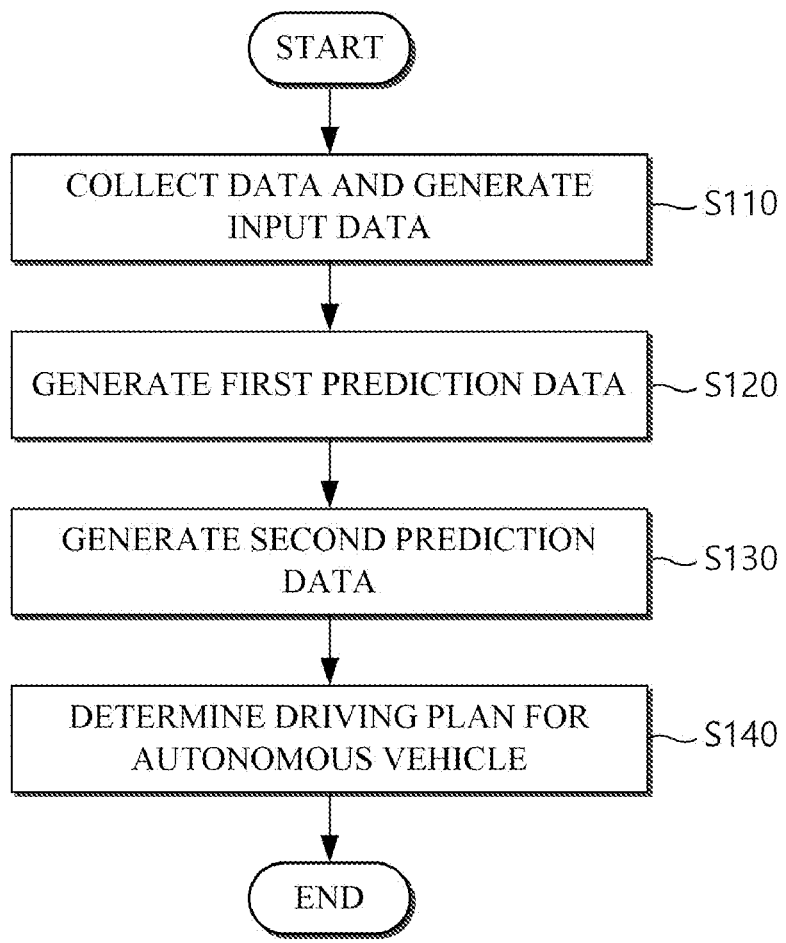
FIG. 3 is a flowchart illustrating a method of determining a driving plan for an autonomous vehicle on the basis of road user prediction according to still another exemplary embodiment of the present invention.

FIG. 3 is a flowchart illustrating a method of determining a driving plan for an autonomous vehicle on the basis of road user prediction according to still another exemplary embodiment of the present invention.

Referring to FIG. 3, in operation S110, the computing device 100 may collect data on the autonomous vehicle 500 and data on surroundings of the autonomous vehicle 500 and generate input data using the collected data.

For example, the computing device 100 may collect data on the autonomous vehicle 500 and data on surroundings of the autonomous vehicle 500 through a sensor provided in an area in which the autonomous vehicle 500 is present and may generate input data for road user prediction using the collected data.

Here, the input data may include perception data and localization data.

First, the perception data may be state data of all road users (or all road users perceived on the basis of collected data) present in a certain range (e.g., a scan range of a sensor) from the autonomous vehicle 500. For example, the perception data may include location, direction, size, velocity, and acceleration data of the road users.

Also, the perception data may include unique number data of each road user. Here, the unique number data of each road user is a unique identification number assigned to the road user for the purpose of continuously tracking and monitoring the road user. For example, the unique number data of each road user may be a number assigned to the road user according to preset rules at a time point when the road user is initially perceived, but is not limited thereto.

The localization data may be state data of the autonomous vehicle 500. For example, the localization data may include location, direction, size, velocity, and acceleration data of the autonomous vehicle 500 but is not limited thereto.

Meanwhile, in predicting an action of a specific road user, whether there is another road user adjacent to the specific road user, a state (the location, the direction, the size, the velocity, and the acceleration) of another road user, and also features of the road may be taken into consideration. For example, when an area in which a specific road user is present is a school zone with a speed limit of 30 km/h or less, the specific road user may be predicted to drive at a velocity of 30 km/h or less regardless of a state of another road user or of whether there is another road user near the specific road user. Also, when a specific road user is at a junction of a small road (e.g., an alley) and a large road, the specific road user may be predicted to stop briefly at the junction and then proceed regardless of a state of another road user or of whether there is another road user near the specific road user.

In this way, in predicting an action of a specific road user, features of a road and a general driving method according to the features of the road may also be taken into consideration. Accordingly, the input data may further include map data. To this end, the computing device 100 may build up map data, that is, precise map data including data on features of a road and a general driving method according to the features of the road, in advance.

Regarding a specific area, the map data may include lane and roadway data, road data (e.g., a vulnerable road user protection zone, a school zone, etc.), a reference route, a target velocity, the maximum velocity, and data on a zone in which yielding is necessary, but is not limited thereto.

Figure 4A:
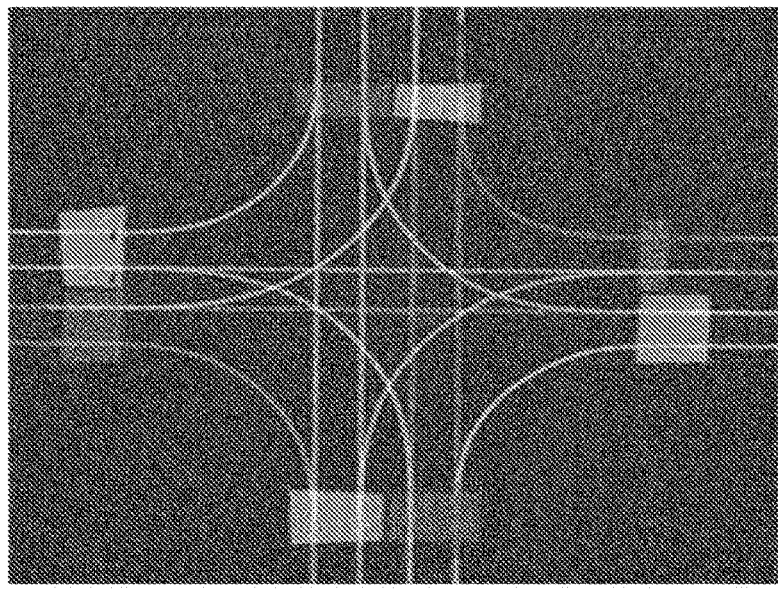
FIGS. 4A and 4B are sets of diagrams illustrating map data which is applicable to various embodiments.

For example, as shown in FIG. 4A, the computing device 100 may generate map data which defines a driving method (e.g., a stop or continuous driving) according to a state of a vehicle, for a stop zone at an intersection with traffic lights, a junction requiring yielding, etc., and record the generated map data in the precise map data.

Figure 4B:
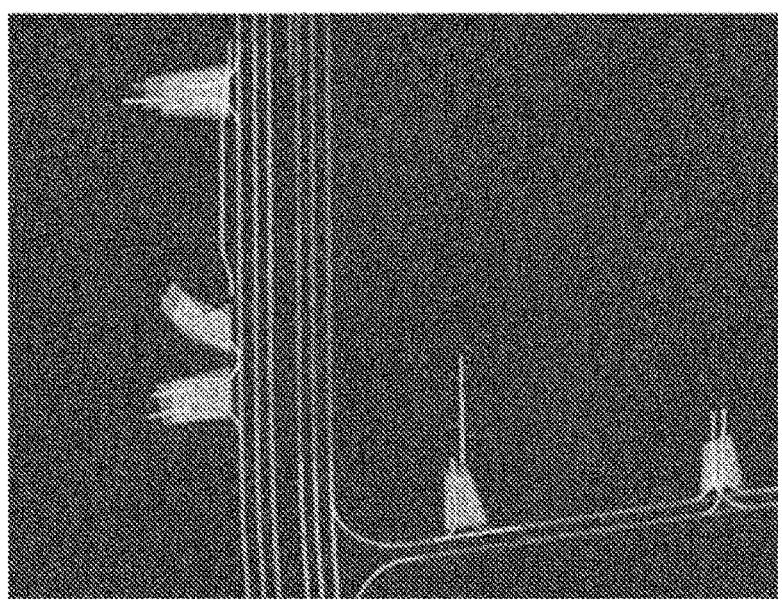

Also, as shown in FIG. 4B, the computing device 100 may generate map data which defines a driving method (e.g., stopping for a short time and then proceeding or the like) according to a state of a road, for a zone in which it is necessary to stop at the end of the road and then move even when there is no traffic light, such as a junction of a small road (e.g., an alley) and a large road, and record the generated map data in the precise map data.

The computing device 100 may generate map data which defines the order of priority of lanes by considering that vehicles going straight ahead have priority over vehicles attempting to merge at a junction, and record the generated map data in the precise map data.

Meanwhile, in predicting an action of a specific road user, the driving plan of the autonomous vehicle 500 may also be taken into consideration. For example, when the specific road user is behind the autonomous vehicle 500, the action of the specific road user behind the autonomous vehicle 500 may be changed with a speed reduction of the autonomous vehicle 500 or a change in the driving path of the autonomous vehicle 500.

In this way, in predicting an action of a specific road user, movement of the autonomous vehicle 500 may also be taken into consideration. Accordingly, the input data may further include plan data of the autonomous vehicle 500.

Here, the plan data may be data on a driving plan predetermined for the autonomous vehicle 500. For example, the plan data may include a driving path and a velocity profile predetermined for the autonomous vehicle 500 but is not limited thereto.

In other words, the input data basically includes perception data and localization data and may also include map data to predict an action of a road user according to a general driving method based on features of the road because a driving method is predictable in some cases according to features of the road regardless of a state of a road user and whether there is a road user. Further, since the driving plan of the autonomous vehicle 500 influences an action of an adjacent road user in some cases, the input data may also include plan data to predict an action of a road user according to the driving plan of the autonomous vehicle 500.

In operation S120, the computing device 100 may generate first prediction data using the input data generated through operation S110.

In various embodiments, the computing device 100 may predict an expected driving plan for each of a plurality of road users by analyzing the input data through a first prediction model (e.g., 11 of FIGS. 6 and 8) and generate first prediction data including data on the predicted expected driving plan (i.e., the first prediction model may generate the first prediction data by making predictions about the plurality of road users).

Here, the first prediction model 11 may be a model which may predict expected driving plans for all the perceived road users by analyzing the input data. When the expected driving plans for all the road users are precisely predicted, the calculation takes a long time, and thus a determination of a driving plan for the autonomous vehicle 500 may be delayed. Since the delay may affect control over the autonomous vehicle 500, the first prediction model 11 may be a model that has short calculation time and low data throughput.

As an embodiment, the first prediction model 11 may be, but is not limited to, a model which predicts a state of a road user on the basis of an algorithm, that is, a rule-based model, for example, a model for which a plurality of rules (if-then statements) are defined in advance and that defines a state of a road user through the algorithm according to the plurality of previously defined rules.

Here, an expected driving plan of a road user may include an expected driving path and an expected velocity profile of the road user. For example, the computing device 100 may predict an expected driving path and a velocity profile of the road user for a certain time period in the future on the basis of the first prediction model 11, but a method of predicting an expected driving path and a velocity profile of a road user is not limited thereto.

In various embodiments, the computing device 100 may predict an expected driving path of a road user. Specifically, the computing device 100 may predict any one of a plurality of reference paths as an expected driving path of a road user on the basis of data on the plurality of reference paths recorded in the precise map data. For example, the computing device 100 may select a reference path corresponding to the location of a specific road user from among the plurality of reference paths on the basis of the location of the specific road user. Also, when two or more reference paths correspond to the location of the specific road user, the computing device 100 may select any one of the two or more reference paths on the basis of perception data of the specific road user.

When the specific road user is not on a plurality of reference paths, the computing device 100 may predict an expected driving path of the specific road user so that the location of the specific road user converges on the closest reference path, but a method of predicting an expected driving path of a road user is not limited thereto.

In various embodiments, the computing device 100 may predict an expected velocity profile of a road user, specifically, on the basis of velocity data recorded in the precise map data. For example, the computing device 100 may predict a velocity profile of a specific road user and, for realistic prediction, may predict the maximum speed of the road user on the basis of an upper speed limit included in the precise map data, but a method of predicting a velocity profile of a road user is not limited thereto.

In various embodiments, when a plurality of expected driving plans are predicted for any one of the plurality of road users, the computing device 100 may calculate a possibility value corresponding to the probability of each of the plurality of expected driving plans and generate first prediction data including data on the calculated probability value. Here, the computing device 100 may exclude at least one expected driving plan (e.g., an expected driving plan having a probability value of less than a reference value) from the plurality of expected driving plans on the basis of the probability values calculated for the plurality of expected driving plans, but a method of excluding an expected driving plan is not limited thereto.

In various embodiments, when a plurality of expected driving plans are predicted for any one of the plurality of road users, the computing device 100 may calculate an importance level (e.g., the degree of consideration to be given in determining a driving plan for the autonomous vehicle 500) of each of the plurality of expected driving plans on the basis of the driving plan predetermined for the autonomous vehicle 500.

For example, on the basis of the driving plan predetermined for the autonomous vehicle 500, the computing device 100 may give 1 to an expected driving plan including an expected driving path overlapping a driving path included in the driving plan for the autonomous vehicle 500 among the plurality of expected driving plans and give 0 to an expected driving plan including an expected driving path not overlapping a driving path included in the driving plan for the autonomous vehicle 500 (e.g., an expected driving path for driving along the same path as the autonomous vehicle 500 behind the autonomous vehicle 500). However, a method of giving an importance level is not limited thereto.

In various embodiments, when a plurality of expected driving plans are predicted for any one of the plurality of road users, the computing device 100 may exclude an expected driving plan having a transverse acceleration (e.g., an acceleration in a direction perpendicular to a travel direction) of a specific value or more from among the plurality of expected driving plans. In other words, since a path having a considerably high transverse acceleration may be a path that is practically impossible to travel, the computing device 100 may filter out an expected driving plan including a path that is practically impossible to travel by considering a transverse acceleration. Here, all transverse accelerations of the plurality of expected driving plans may be the specific value or more, and thus all the plurality of expected driving plans may be excluded. In this case, the computing device 100 may select only an expected driving plan having a transverse acceleration of the lowest value from among the plurality of expected driving plans. However, a method of selecting an expected driving plan is not limited thereto.

In various embodiments, the computing device 100 may generate first prediction data using data collected at preset intervals. For example, the computing device 100 may generate first input data through data collected at a first time point, make predictions about a plurality of road users using the first input data, and thereby output first prediction data of the first time point. Also, the computing device 100 may generate second input data through data collected at a second time point after the first time point, make predictions about the plurality of road users using the second input data, and thereby output first prediction data of the second time point.

When a similarity between the first input data and the second input data is less than a reference value, the computing device 100 may output the first prediction data of the second time point using the second input data. When the similarity between the first input data and the second input data is the reference value or more, the computing device 100 may output the first prediction data of the first time point again as the first prediction data of the second time point.

In other words, the computing device 100 may generate first prediction data on the basis of data collected at each time point according to preset intervals (e.g., intervals for collecting data), and when data collected at adjacent time points is similar, that is, when it is determined that data included in input data is not updated, may output previously generated first prediction data again without generating new first prediction data.

In operation S130, the computing device 100 may generate second prediction data using the input data generated through operation S110.

In various embodiments, the computing device 100 may predict an expected driving plan for at least one of the plurality of road users included in the input data by analyzing only data on the at least one road user using a second prediction model (e.g., 12 of FIGS. 6 and 8) and generate second prediction data including data on the predicted expected driving plan.

Here, the second prediction model 12 may differ from the first prediction model 11. For example, unlike the first prediction model 11, the second prediction model 12 may not predict expected driving plans for all the perceived road users but may precisely predict expected driving plans for only some important road users (some of the plurality of perceived road users, e.g., objects of interest to be described below) (i.e., the second prediction model may generate second prediction data by making predictions about only some of the plurality of road users). Therefore, the second prediction model 12 may be a model that has long calculation time and high data throughput compared to the first prediction model 11. Accordingly, the second prediction data generated by the second prediction model 12 may include more precise and accurate prediction data than the first prediction data generated by the first prediction model 11.

As an embodiment, the second prediction model 12 may be a model which predicts a state of a road user on the basis of data learning, but is not limited thereto.

In general, predicting a future action of a road user involves a process of modeling the trajectory of the road user. Therefore, according to the related art, the trajectory of a road user is modeled in person on the basis of the road user's dynamics features or modeled using a method such as a hidden Markov model. However, this is less flexible than an artificial neural network-based trajectory modeling method.

Meanwhile, in the case of modeling a trajectory using only an artificial neural network having an advantage in a spatial series, a road user may be stably detected. In this case, however, a road user is determined on the basis of an instantaneous time point without considering a time-series feature, and thus this is vulnerable to time-series features of a road user, for example, a case in which road users interact with each other or a case of moving with a distinguishing intention.

Considering this, the computing device 100 may make a prediction about a road user using the second prediction model 12 in which a spatial series-based artificial neural network (e.g., a CNN or the like) and a time series-based artificial neural network (e.g., an RNN, a long-term short memory (LSTM), etc.) are combined.

As an example of the second prediction model 12, a model which classifies expected trajectories of road users into various trajectory sets may be used (e.g., see Plan-Minh, Tung, et al. "CoverNet: Multimodal behavior prediction using trajectory sets." Proceedings of the IEEE/CVF Conference on Computer Vision and Pattern Recognition. 2020).

As another example of the second prediction model 12, a multipath model may be applied that predicts a discrete distribution over anchors using a fixed set of future state-sequence anchors corresponding to a trajectory distribution mode and calculates a Gaussian mixture at each time step by regressing offsets from anchor waypoints along with uncertainties (e.g., Chai, Yuning, et al. "Multipath: Multiple probabilistic anchor trajectory hypotheses for behavior prediction." arXiv preprint arXiv:1910.05449 (2019)).

As another example of the second prediction model 12, a model may be applied that probabilistically predicts future interactions among varying numbers of road users (e.g., Rhinehart, Nicholas, et al. "Precog: Prediction conditioned on goals in visual multi-agent settings." Proceedings of the IEEE/CVF International Conference on Computer Vision. 2019).

As another example of the second prediction model 12, a model may be applied that solves the problem of relational behavior forecasting from sensor data by modeling interactions between road users in a scene (e.g., Casas, Sergio, et al. "Spagnn: Spatially-aware graph neural networks for relational behavior forecasting from sensor data." 2020 IEEE International Conference on Robotics and Automation (ICRA). IEEE, 2020).

As another example of the second prediction model 12, a model may be applied that predicts a motion of a road user by capturing uncertainty inherent in long-range motion forecasting (e.g., Jain, Ajay, et al. "Discrete residual flow for probabilistic pedestrian behavior prediction." Conference on Robot Learning. PMLR, 2020).

As another example of the second prediction model 12, a deep learning model may be applied that encodes each road user's surrounding context into raster image and uses the raster image as an input to estimate possible trajectories and their probabilities (e.g., Cui, Henggang, et al. "Multimodal trajectory predictions for autonomous driving using deep convolutional networks." 2019 International Conference on Robotics and Automation (ICRA). IEEE, 2019).

As another example of the second prediction model 12, a model may be applied that predicts a kinematically feasible motion of a road user (e.g., Cui, Henggang, et al. "Deep kinematic models for kinematically feasible vehicle trajectory predictions." 2020 International Conference on Robotics and Automation (ICRA). IEEE, 2020).

As another example of the second prediction model 12, a model may be applied that predicts near-term trajectories of road users in dense traffic videos (e.g., Chandra, Rohan, et al. "Traphic: Trajectory prediction in dense and heterogeneous traffic using weighted interactions." Proceedings of the IEEE/CVF Conference on Computer Vision and Pattern Recognition. 2019).

As another example of the second prediction model 12, a model may be applied that represents environmental data of road users (particularly pedestrians) using multi-channel tensors and performs realistic trajectory prediction on the basis of the environmental data (e.g., Chen, Kai, et al. "Pedestrian behavior prediction model with a convolutional LSTM encoder-decoder." Physica A: Statistical Mechanics and its Applications 560 (2020): 125132).

As another example of the second prediction model 12, a model may be applied that encodes circumstances as an image and predicts a path of a road user using the image as input data (e.g., Djuric, Nemanj a, et al. "Short-term motion prediction of traffic actors for autonomous driving using deep convolutional networks." arXiv preprint arXiv: 1808.05819 1.2 (2018): 6).

As another example of the second prediction model 12, a model may be applied that rasterizes high-definition maps and surroundings of road users into a bird's-eye view image and uses the image as an input to predict paths of the road users (particularly, pedestrians and bicycles) (e.g., Chou, Fang-Chieh, et al. "Predicting motion of vulnerable road users using high-definition maps and efficient convnets." 2020 IEEE Intelligent Vehicles Symposium (IV). IEEE, 2020).

As another example of the second prediction model 12, a model may be applied that puts perception results and map data in a grid and uses a four-dimensional (4D) tensor to which the temporal dimension is added as an input to predict a path of a road user (e.g., Hong, Joey, Benjamin Sapp, and James Philbin. "Rules of the road: Predicting driving behavior with a convolutional model of semantic interactions." Proceedings of the IEEE/CVF Conference on Computer Vision and Pattern Recognition. 2019).

As another example of the second prediction model 12, a conditional variational autoencoder (CVAE)-based sample generation model may be applied that predicts multiple paths of a road user through an inverse optimal control (IOC)-based ranking model (e.g., Lee, Namhoon, et al. "Desire: Distant future prediction in dynamic scenes with interacting agents." Proceedings of the IEEE Conference on Computer Vision and Pattern Recognition. 2017).

As another example of the second prediction model 12, a model may be applied that receives and encodes past trajectories and geographic features around a prediction target, outputs a future trajectory of the prediction target to a decoder, and predicts the uncertainty of multiple paths for a road user through a generative adversarial neural network (e.g., Zhao, Tianyang, et al. "Multi-agent tensor fusion for contextual trajectory prediction." Proceedings of the IEEE/CVF Conference on Computer Vision and Pattern Recognition. 2019).

As another example of the second prediction model 12, a model may be applied that performs multipath prediction for a road user at a specific location such as a traffic circle or the like (e.g., Zyner, Alex, Stewart Worrall, and Eduardo Nebot. "Naturalistic driver intention and path prediction using recurrent neural networks." IEEE transactions on intelligent transportation systems 21.4 (2019): 1584-1594).

As another example of the second prediction model 12, an LSTM-CNN hybrid model may be applied that is designed on the basis of the assumption that it is important to interact with a road user present in a travel direction of a prediction target and the assumption that an interaction varies depending on the type of a road user (e.g., Chandra, Rohan, et al. "TraPHic: Trajectory prediction in dense and heterogeneous traffic using weighted interactions." Proceedings of the IEEE/CVF Conference on Computer Vision and Pattern Recognition. 2019)).

As another example of the second prediction model 12, a model may be applied that learns a model including an instance layer and a category layer to make a prediction on the basis of the assumption that an interaction varies depending on the type of road user (e.g., Ma, Yuexin, et al. "Trafficpredict: Trajectory prediction for heterogeneous traffic-agents." Proceedings of the AAAI conference on artificial intelligence. Vol. 33. No 01. 2019).

As another example of the second prediction model 12, a path prediction model based on the trajectories of surrounding vehicles and motion prediction of vehicles may be applied (e.g., Deo, Nachiket, and Mohan M. Trivedi. "Multimodal trajectory prediction of surrounding vehicles with maneuver based LSTMs." 2018 IEEE Intelligent Vehicles Symposium (IV). IEEE, 2018).

As another example of the second prediction model 12, a model may be applied that encodes interaction context through convolutional social pooling, concatenates the encoded interaction context with results of encoding past trajectories of a prediction-target vehicle, and outputs the concatenation result as a multimodal trajectory through a decoder (e.g., Deo, Nachiket, and Mohan M. Trivedi. "Convolutional social pooling for vehicle trajectory prediction." Proceedings of the IEEE Conference on Computer Vision and Pattern Recognition Workshops. 2018).

In addition to these examples, a VectorNet or LaneGCN model based on a graph convolutional network (GCN) may be applied as the second prediction model 12.

In various embodiments, the computing device 100 may set at least one of the plurality of road users as an object of interest, predict an expected driving plan for the object of interest by analyzing only data on the object of interest in data on the plurality of road users included in the input data, and generate second prediction data including only the predicted expected driving plan, that is, an expected driving plan for the object of interest.

More specifically, the computing device 100 may select at least one road user who influences determination of a driving plan for the autonomous vehicle 500 from among the plurality of road users and set the selected at least one road user as an object of interest.

For example, through operation S140 to be described below, the computing device 100 may generate a driving path for the autonomous vehicle 500 and a plurality of velocity profiles for the driving path on the basis of the first prediction data and the second prediction data, calculate cost values of the plurality of velocity profiles on the basis of prediction results of the plurality of road users (e.g., on the basis of a cost function), and set at least one of the plurality of road users who influences calculation of the cost values as an object of interest.

In operation S140, the computing device 100 may determine a driving plan for the autonomous vehicle 500 using the first prediction data generated through operation S120 and the second prediction data generated through operation S130. A method of determining a driving plan for an autonomous vehicle on the basis of road user prediction according to a first exemplary embodiment or a second exemplary embodiment will be described below with reference to FIGS. 5 to 8.

Figure 5:
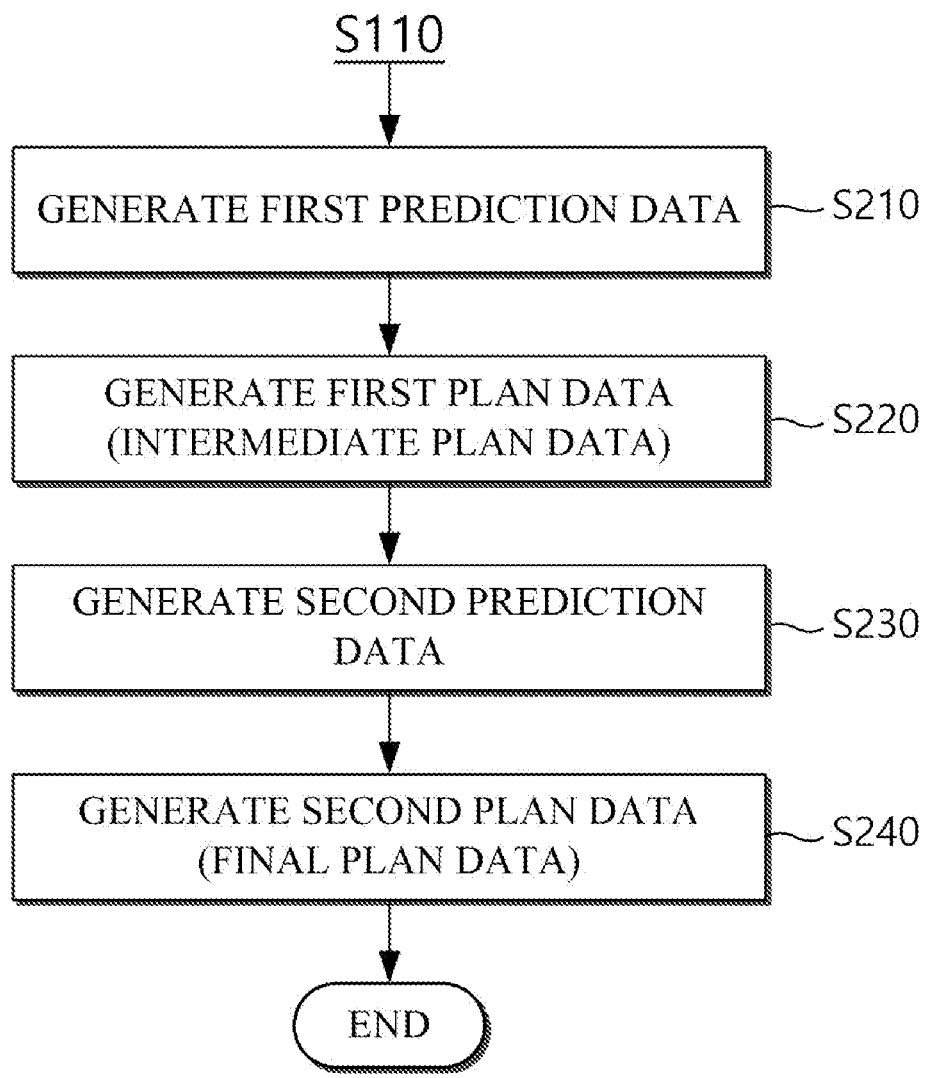
FIG. 5 is a flowchart illustrating a method of determining a driving plan for an autonomous vehicle on the basis of road user prediction according to a first embodiment.

FIG. 5 is a flowchart illustrating a method of determining a driving plan for an autonomous vehicle on the basis of road user prediction according to a first embodiment, and FIG. 6 is a diagram illustrating a process of determining a driving plan for an autonomous vehicle on the basis of road user prediction according to the first embodiment.

Referring to FIGS. 5 and 6, in operation S210, the computing device 100 may generate first prediction data. For example, the computing device 100 may generate first prediction data including prediction results about a plurality of road users by analyzing input data through the first prediction model 11.

Here, the computing device 100 predicts actions of all the road users using localization data (localization data of the autonomous vehicle 500), perception data (perception data of all the road users), and map data. Since the driving plan predetermined for the autonomous vehicle 500 may be taken into consideration to predict actions of road users, the computing device 100 may generate first prediction data by considering second plan data which is determined by a plan model 20 in a process performed before first prediction data is generated.

A first prediction data generation method performed by the computing device 100 may be implemented in a form identical or similar to the first prediction data generation method performed in operation S120 of FIG. 3, but is not limited thereto.

In operation S220, the computing device 100 may generate first plan data using the first prediction data generated through operation S210. For example, the computing device 100 may generate first plan data as intermediate plan data for the autonomous vehicle 500 by analyzing the first prediction data through the plan model 20.

Here, the first plan data may include not only a driving path and a velocity profile of the autonomous vehicle 500 but also data on at least one road user who influences determination of the driving plan and the velocity profile of the autonomous vehicle 500 from among a plurality of road users, that is, data on an object of interest.

In operation S230, the computing device 100 may generate second prediction data on the basis of the first plan data generated through operation S220.

For example, the computing device 100 may extract only data on the object of interest from data on the plurality of road users included in input data on the basis of data on at least one road user (data on the object of interest) included in the first plan data and generate second prediction data including a prediction result about the object of interest by analyzing only the extracted data on the object of interest through the second prediction model 12. Here, a second prediction data generation method performed by the computing device 100 may be implemented in a form identical or similar to the second prediction data generation method performed in operation S130 of FIG. 3, but is not limited thereto.

In operation S240, the computing device 100 may generate second plan data using the first prediction data generated through operation S210 and the second prediction data generated through operation S230.

For example, the computing device 100 may generate second plan data including a final driving path and a final velocity profile of the autonomous vehicle 500 as final plan data for the autonomous vehicle 500 by analyzing the first prediction data and the second prediction data through the plan model 20. It has been described above that the computing device 100 newly generates second plan data on the basis of the first prediction data and the second prediction data. However, the present invention is not limited thereto, and in some cases, the computing device 100 may generate second plan data by correcting first plan data on the basis of the first prediction data and the second prediction data.

Figure 7:
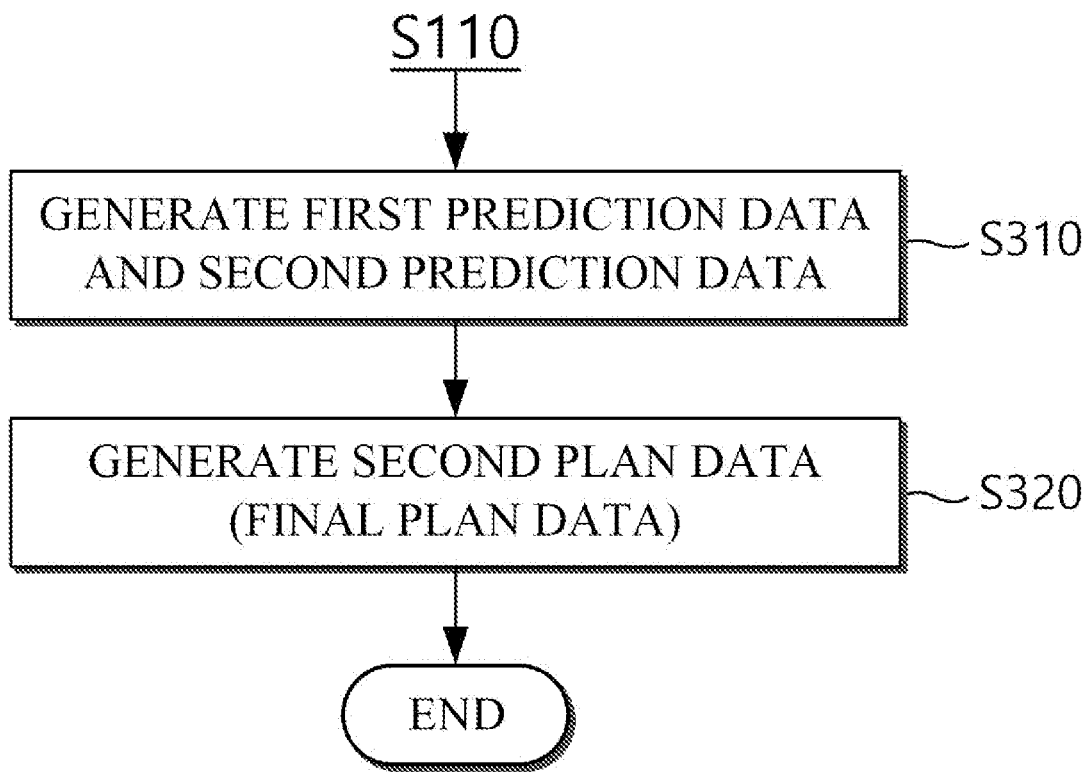
FIG. 7 is a flowchart illustrating a method of determining a driving plan for an autonomous vehicle on the basis of road user prediction according to a second embodiment.

FIG. 7 is a flowchart illustrating a method of determining a driving plan for an autonomous vehicle on the basis of road user prediction according to a second embodiment, and FIG. 8 is a diagram illustrating a process of determining a driving plan for an autonomous vehicle on the basis of road user prediction according to the second embodiment.

Referring to FIGS. 7 and 8, in operation S310, the computing device 100 may generate first prediction data and second prediction data.

In various embodiments, the computing device 100 may generate first prediction data including prediction results about a plurality of road users by analyzing input data through a first prediction model 11. Here, a first prediction data generation method performed by the computing device 100 may be implemented in a form identical or similar to the first prediction data generation method performed in operation S120 of FIG. 3 and operation S210 of FIG. 5, but is not limited thereto.

Also, the computing device 100 may generate second prediction data including only a prediction result about a specific road user among the plurality of road users by analyzing the input data through a second prediction model 12. Here, a second prediction data generation method performed by the computing device 100 may be implemented in a form identical or similar to the second prediction data generation method performed in operation S130 of FIG. 3, but is not limited thereto.

The specific road user may be a road user that is set as an object of interest through the process of determining a driving plan for an autonomous vehicle on the basis of road user prediction which is performed before the computing device 100 performs the operation of generating second prediction data.

For example, the computing device 100 may generate second prediction data including only a prediction result about a specific road user by analyzing only data corresponding to the specific road user in first input data generated on the basis of first data collected at a first time point. Here, the specific road user may be a road user that is set as an object of interest on the basis of second data collected at a second time point before the first time point.

In general, perception data about a plurality of road users is periodically generated at considerably short intervals, and thus road users set as objects of interest in consecutively performed processes of determining a driving plan for an autonomous vehicle on the basis of road user prediction are highly likely to be the same.

In other words, considering that road users set as objects of interest in consecutively performed processes are highly likely to be the same, the computing device 100 generates first prediction data through the first prediction model 11 and generates second prediction data through the second prediction model 12 on the basis of data on a road user set as an object of interest in a previous process. Accordingly, the first prediction data and the second prediction data can be rapidly generated, and in this way, it is possible to reduce a time for making a final driving plan for the autonomous vehicle 500.

In operation S320, the computing device 100 may generate second plan data using the first prediction data and the second prediction data generated through operation S310.

Here, the computing device 100 may set at least one of the plurality of road users as an object of interest on the basis of the first prediction data and provide data on the at least one road user set as the object of interest to the second prediction model 12 so that the second prediction model 12 may generate second prediction data including a prediction result about the at least one road user in the next process.

According to various embodiments of the present invention, a prediction about a road user is made through two different prediction models so that an accurate prediction result about the road user can be produced. Accordingly, it is possible to improve safety of an autonomous vehicle and the convenience and satisfaction of a passenger by determining a driving plan for the autonomous vehicle on the basis of the prediction result.

Also, it is possible to make a prediction about a road user through an algorithm-based first prediction model and a data learning-based second prediction model and improve prediction performance while minimizing an increase in the amount of computation by making predictions about all road users through the first prediction model and making predictions about significant road users through the second prediction model.

Effects of the present invention are not limited to those described above, and other effects which have not been described will be clearly understood by those of ordinary skill in the art from the above description.

The method of determining a driving plan for an autonomous vehicle on the basis of road user prediction has been described above with reference to the flowcharts shown in the drawings. While the method of determining a driving plan for an autonomous vehicle on the basis of road user prediction has been shown and described as a series of blocks for the purpose of simplicity of description, the present invention is not limited to the order of the blocks. Some blocks may be performed concurrently or in an order different from that shown and described herein. Also, a new block which is not described herein or shown in the drawings may be added, or some blocks may be removed or changed.

Although embodiments of the present invention have been described with reference to the accompanying drawings, those skilled in the technical field to which the present invention pertains should appreciate that the present invention can be implemented in other specific forms without changing the technical spirit or essential characteristics. Therefore, the above-described embodiments should be understood as illustrative in all aspects and are not restrictive.

What is claimed is:

1. A method of determining a driving plan for an autonomous vehicle on the basis of road user prediction which is performed by a computing device, the method comprising:
   generating first prediction data including prediction results about a plurality of road users near an autonomous vehicle;
   generating second prediction data including only a prediction result about at least one of the plurality of road users;
   determining a driving plan for the autonomous vehicle using the generated first prediction data and the generated second prediction data;
   collecting, through sensors provided on the autonomous vehicle, information regarding the autonomous vehicle and a surrounding environment or area of the autonomous vehicle, and generating input data for road user prediction using the collected information,
   wherein the generated input data includes at least one of perception data including data on the plurality of road users, localization data including the data on the autonomous vehicle, map data of an area in which the autonomous vehicle is present, and plan data of a driving plan determined in advance for the autonomous vehicle,
   wherein the generating of the first prediction data comprises:
      predicting an expected driving plan, which includes an expected driving path and an expected velocity profile, for each of the plurality of road users by analyzing the generated input data using an algorithm-based first prediction model; and
      generating the first prediction data including the predicted expected driving plan, and
   wherein the predicting of the expected driving plan comprises:
      when a plurality of expected driving plans are predicted for any one of the plurality of road users, excluding an expected driving plan in which an acceleration in a perpendicular direction to a travel direction is a specific value or more from the plurality of predicted expected driving plans; and
      when all the plurality of predicted expected driving plans are excluded, selecting only an expected driving plan having a lowest acceleration in a perpendicular direction to the travel direction from among the plurality of predicted expected driving plans; and
   performing an autonomous driving control on the autonomous vehicle in accordance with the determined driving plan.

2. The method of claim 1, wherein the predicting of the expected driving plan comprises, when a plurality of expected driving plans are predicted for any one of the plurality of road users, calculating a probability value corresponding to a possibility of each of the plurality of predicted expected driving plans.

3. The method of claim 1, wherein the predicting of the expected driving plan comprises, when a plurality of expected driving plans are predicted for any one of the plurality of road users, calculating an importance level of each of the plurality of predicted expected driving plans on the basis of a driving plan determined in advance for the autonomous vehicle.

4. The method of claim 1, wherein the generating of the first prediction data comprises outputting first prediction data for a first time point using first input data generated from data collected at the first time point, outputting first prediction data for a second time point using second input data generated from data collected at the second time point after the first time point, and
    outputting the first prediction data for the first time point as the first prediction data for the second time point when a similarity between the first input data and the second input data is a reference value or more.

5. The method of claim 1, wherein the generating of the second prediction data comprises:
    predicting an expected driving plan which includes an expected driving path and an expected velocity profile, for the at least one road user by analyzing the generated input data using a data learning-based second prediction model which includes a spatial series-based artificial neural network and a time series-based artificial neural network; and
    generating the second prediction data including the predicted expected driving plan.

6. The method of claim 1, wherein the generating of the second prediction data comprises:
    setting an object of interest using the generated first prediction data; and
    generating the second prediction data only including a prediction result about the object of interest by analyzing only data on the set object of interest in the generated input data.

7. The method of claim 6, wherein the setting of the object of interest comprises setting at least one road user who influences the determining of the driving plan for the autonomous vehicle among the plurality of road users as the object of interest on the basis of the generated first prediction data.

8. The method of claim 1, wherein the generating of the second prediction data comprises generating the second prediction data only including a prediction result about a specific road user by analyzing only data on the specific road user in first data collected at a first time point,
    wherein the specific road user is an object of interest set on the basis of second data collected at a second time point before the first time point.

9. A method of determining a driving plan for an autonomous vehicle on the basis of road user prediction which is performed by a computing device, the method comprising:
    generating, by a first prediction model, predictions about a plurality of road users near an autonomous vehicle to generate first prediction data;
    setting some of the plurality of road users as objects of interest using the generated first prediction data;
    generating, by a second prediction model different from the first prediction model, predictions about the objects of interest to generate second prediction data;
    determining a driving plan for the autonomous vehicle using the generated first prediction data and the generated second prediction data;
    collecting, through sensors provided on the autonomous vehicle, information regarding the autonomous vehicle and a surrounding environment or area of the autonomous vehicle, and generating input data for road user prediction using the collected information,
    wherein the generated input data includes at least one of perception data including data on the plurality of road users, localization data including the data on the autonomous vehicle, map data of an area in which the autonomous vehicle is present, and plan data of a driving plan determined in advance for the autonomous vehicle,
    wherein the generating of the predictions comprises:
        predicting an expected driving plan, which includes an expected driving path and an expected velocity profile, for each of the plurality of road users by analyzing the generated input data using an algorithm-based first prediction model; and
        generating the first prediction data including the predicted expected driving plan, and
    wherein the predicting of the expected driving plan comprises:
        when a plurality of expected driving plans are predicted for any one of the plurality of road users, excluding an expected driving plan in which an acceleration in a perpendicular direction to a travel direction is a specific value or more from the plurality of predicted expected driving plans; and
        when all the plurality of predicted expected driving plans are excluded, selecting only an expected driving plan having a lowest acceleration in a perpendicular direction to the travel direction from among the plurality of predicted expected driving plans; and
    performing autonomous driving control on the autonomous vehicle in accordance with the determined driving plan.

10. A computing device for performing a method of determining a driving plan for an autonomous vehicle on the basis of road user prediction, the computing device comprising:
    a processor;
    a network interface;
    a memory; and
    a computer program which is loaded into the memory and executed by the processor,
    wherein the computer program includes:
    an instruction for generating first prediction data including prediction results about a plurality of road users near an autonomous vehicle;
    an instruction for generating second prediction data including only a prediction result about at least one of the plurality of road users;
    an instruction for determining a driving plan for the autonomous vehicle using the generated first prediction data and the generated second prediction data;
    an instruction for collecting, through sensors provided on the autonomous vehicle, information regarding the autonomous vehicle and a surrounding environment or area of the autonomous vehicle, and generating input data for road user prediction using the collected information,
    wherein the generated input data includes at least one of perception data including data on the plurality of road users, localization data including the data on the autonomous vehicle, map data of an area in which the autonomous vehicle is present, and plan data of a driving plan determined in advance for the autonomous vehicle,
    wherein the instruction for generating of the first prediction data includes:
        an instruction for predicting an expected driving plan, which includes an expected driving path and an expected velocity profile, for each of the plurality of road users by analyzing the generated input data using an algorithm-based first prediction model; and
        an instruction for generating the first prediction data including the predicted expected driving plan, and wherein the instruction for predicting of the expected driving plan includes:
an instruction for, when a plurality of expected driving plans are predicted for any one of the plurality of road users, excluding an expected driving plan in which an acceleration in a perpendicular direction to a travel direction is a specific value or more from the plurality of predicted expected driving plans; and
an instruction for, when all the plurality of predicted expected driving plans are excluded, selecting only an expected driving plan having a lowest acceleration in a perpendicular direction to the travel direction from among the plurality of predicted expected driving plans; and
an instruction for performing autonomous driving control on the autonomous vehicle in accordance with the determined driving plan.

11. A non-transitory recording medium readable by a computing device on which a program for performing a method of determining a driving plan for an autonomous vehicle on the basis of road user prediction in combination with a computing device is recorded, the method comprising:
generating first prediction data including prediction results about a plurality of road users near an autonomous vehicle;
generating second prediction data including only a prediction result about at least one of the plurality of road users;
determining a driving plan for the autonomous vehicle using the generated first prediction data and the generated second prediction data;
collecting, through sensors provided on the autonomous vehicle, information regarding the autonomous vehicle and a surrounding environment or area of the autonomous vehicle, and generating input data for road user prediction using the collected information,
wherein the generated input data includes at least one of perception data including data on the plurality of road users, localization data including the data on the autonomous vehicle, map data of an area in which the autonomous vehicle is present, and plan data of a driving plan determined in advance for the autonomous vehicle,
wherein the generating of the first prediction data comprises:
predicting an expected driving plan, which includes an expected driving path and an expected velocity profile, for each of the plurality of road users by analyzing the generated input data using an algorithm-based first prediction model; and
generating the first prediction data including the predicted expected driving plan, and
wherein the predicting of the expected driving plan comprises:
when a plurality of expected driving plans are predicted for any one of the plurality of road users, excluding an expected driving plan in which an acceleration in a perpendicular direction to a travel direction is a specific value or more from the plurality of predicted expected driving plans; and
when all the plurality of predicted expected driving plans are excluded, selecting only an expected driving plan having a lowest acceleration in a perpendicular direction to the travel direction from among the plurality of predicted expected driving plans; and
performing autonomous driving control on the autonomous vehicle in accordance with the determined driving plan.

* * * * *